United States Patent [19]
Bostic

[11] Patent Number: 5,810,517
[45] Date of Patent: Sep. 22, 1998

[54] ROTARY MILLING CUTTERS

[75] Inventor: Raymond R. Bostic, Monroe, Mich.

[73] Assignee: Monroe Cutting Tool Inc., Monroe, Mich.

[21] Appl. No.: 82,549

[22] Filed: Jun. 28, 1993

[51] Int. Cl.⁶ ................................................. B23C 5/10
[52] U.S. Cl. .............................................. 407/53; 408/227
[58] Field of Search .................. 407/53, 54; 408/144, 408/199, 227, 229, 231, 233, 238, 713

[56] References Cited

U.S. PATENT DOCUMENTS

| | | | |
|---|---|---|---|
| 2,391,396 | 12/1945 | Denison | 77/67 |
| 2,640,379 | 6/1953 | Graves | 77/67 |
| 2,898,787 | 8/1959 | Hofbauer | 77/73.5 |
| 3,548,688 | 12/1970 | Kuch | 77/70 |
| 3,564,945 | 2/1971 | Bradley | 77/65 |
| 4,065,224 | 12/1977 | Siddall | 408/230 |
| 4,132,493 | 1/1979 | Hosoi | 407/53 |
| 4,225,275 | 9/1980 | Elliott | 408/229 |
| 4,231,692 | 11/1980 | Brabetz et al. | 408/230 |
| 4,252,481 | 2/1981 | Krieg | 408/229 |
| 4,458,769 | 7/1984 | Rumpp et al. | 175/394 |
| 4,605,347 | 8/1986 | Jodock et al. | 408/224 |
| 4,645,389 | 2/1987 | Maier | 408/230 |
| 4,688,972 | 8/1987 | Kubota | 408/230 |
| 5,094,571 | 3/1992 | Ekerot | 408/144 |

FOREIGN PATENT DOCUMENTS

| | | | |
|---|---|---|---|
| 488623 | 6/1992 | European Pat. Off. | 408/144 |
| 124508 | 7/1984 | Japan | 408/199 |

*Primary Examiner*—Daniel W. Howell
*Attorney, Agent, or Firm*—Brinks Hofer Gilson & Lione

[57] ABSTRACT

A rotary cutting tool includes three complexly-configured, equally-spaced cutting edges. In a first embodiment, which may generally be characterized as an angle milling cutter or countersink, the cutting edges are defined by the intersection of right circular cylinders, offset from the axis of the countersink, with the frustum of a cone. The axes of the cylinders are displaced from the cone axis a distance greater than their radii. The second embodiment, which may generally be characterized as an end mill, also includes three flutes and three cutting edges. Rather than a frustum of a cone, however, the end mill includes a circumferentially radiused edge defining a quarter section of a torus disposed coaxially about the cutter axis. The cutting edges are thus defined by the inter-section of the flutes defined by offset right circular cylinders and the circumferentially radiused edge. A third embodiment is similar to the first embodiment but comprehends a conical milling cutter which converges to a vertex.

28 Claims, 3 Drawing Sheets

ROTARY MILLING CUTTERS

BACKGROUND OF THE INVENTION

The invention relates generally to rotary cutting tools and more specifically to cutting tool configurations which may be generally characterized as angle milling cutters and a radiused end mill.

Drills, machine tool cutters such as countersinks and end mills have been the subject of continuing design efforts in a search to improve the multiple and often conflicting goals of improved drilling or cutting speeds, improved surface finish and improved tool life. The geometry of the cutting edge, that is, such factors as the sharpness of the cutting edge, its relief or undercut, the angle of attack and the motion vector relative to the workpiece have all been examined and improvements developed therein. It is also known that the flutes and the configuration of the support structure affect how removed material is carried away from the cutting edge. The support structure also affects the stability of the cutting edge thus influencing the accuracy and smoothness of the cut. It is thus apparent that there are numerous aspects to cutting tool design and that all have an effect on tool performance.

Numerous designs and improvements therefor are presented in the patent literature. For example, in U.S. Pat. No. 2,391,396, a drill is disclosed which includes a conical point and three spiral flutes having straight, obliquely disposed cutting edges along the surface of the conical point. U.S. Pat. No. 2,640,379 teaches a pyramidial point drill having three flutes which extend axially along the drill.

U.S. Pat. No. 3,564,945 discloses a drill which defines a stepped cone and obliquely oriented slots and cutting edges defined by the intersections of the slots with the stepped exterior surface. U.S. Pat. No. 4,225,275 teaches a drill bit having three equally-spaced cutting edges defined by obliquely extending surfaces which converge at a single point coaxial to the axis of the drill bit. In U.S. Pat. No. 4,645,389, a multiple-tooth drill bit includes at least three teeth and three spiral flutes. The cutting edges of the teeth are arranged generally radially and spaced from the axis of the drill bit.

The foregoing review of patents reveals the diversity of cutting tools such as drills and the like which rotate about an axis and engage a workpiece along such axis. Said review confirms that further improvements in such devices are not only desirable but possible.

SUMMARY OF THE INVENTION

Rotary milling cutters according to the present invention include three complexly-configured, equally-spaced, relieved cutting edges. The first embodiment, which may generally be characterized as a frusto-conical angle milling cutter or countersink, includes three flutes and three cutting edges. The cutting edges are defined by the intersections of right circular cylinders, offset from the axis of the milling cutter, with the frustum of a cone. The axes of the cylinders are displaced from the cone axis a distance greater than its radii. The second embodiment, which may generally be characterized as an end mill or milling cutter, also includes three flutes and three cutting edges. Rather than a frustum of a cone, however, the cutter body includes a circumferentially, concavely radiused edge generally defining a quarter section of a torus disposed coaxially about the cutter axis. The cutting edges are thus defined by the intersection of the three curved walls defined by offset right circular cylinders and the circumferentially radiused edge.

The third embodiment is also an angle milling cutter. Here, however, the oblique conical surfaces converge to form a vertex or point. The configuration of the cutting edges is the same as in the first embodiment. In all three embodiments, the cutting edge is a complex arcuate or crescent shaped curve.

Three distinct configurations of the body and shank of the milling cutters of the present invention are also disclosed. In the first embodiment, a solid body and shank are presented. In the second embodiment a separate body and shank, which may be fabricated of distinct materials are welded or brazed together. In the third embodiment, the body and shank are separate components which are secured together by threaded fasteners. Here, too, the materials from which the body and shank are fabricated may be distinct.

The rotary cutting tools according to the present invention cut in shear and thus provide good surface finish, improved cutting speed and long tool life.

It is thus the object of the present invention to provide an angle milling cutter having uniquely defined cutting edges which represent the intersections of right circular cylinders offset from the axis of the cutter with a conical surface.

It is a further object of the present invention to provide an end mill having uniquely defined cutting edges which represent the intersections of right circular cylinders offset from the axis of the mill with a circumferential radiused edge.

It is a still further object of the present invention to provide a milling cutter having three flutes and three cutting edges defining complex arcuate or crescent shaped curves.

It is a still further object of the present invention to provide a milling cutter which provides excellent cutting performance and long tool life.

It is a still further object of the present invention to provide a milling cutter which provides good surface finish and improved cutting speeds.

Further objects and advantages of the present invention will become apparent by reference to the following description of the preferred embodiments and appended drawings.

DESCRIPTION OF THE PREFERRED EMBODIMENTS

Three embodiments of the present invention will be described. All three may be defined as cutting tools or, more specifically, milling cutters which rotate about a center axis and all include the novel features of the invention, differing in the configuration of the cutting tool and cutting edge as viewed from the side, i.e., in elevation.

The first cutting tool according to the present invention is an angle milling cutter or countersink and defines curved cutting edges oriented at, for example, a forty-five degree angle to the axis of the tool which cut or form a complementary frusto-conical surface in a workpiece. The second embodiment, an end mill, also defines three curved cutting edges but the cutting edges define a quarter of a circle when viewed from the side, i.e., in elevation. This tool thus forms a circular feature in a workpiece having a convex surface. The third embodiment is also an angle milling cutter. Here, however, the oblique, conical surfaces converge to form a vertex or point. The configuration of the cutting edges is the same as in the first embodiment.

Figure 1:
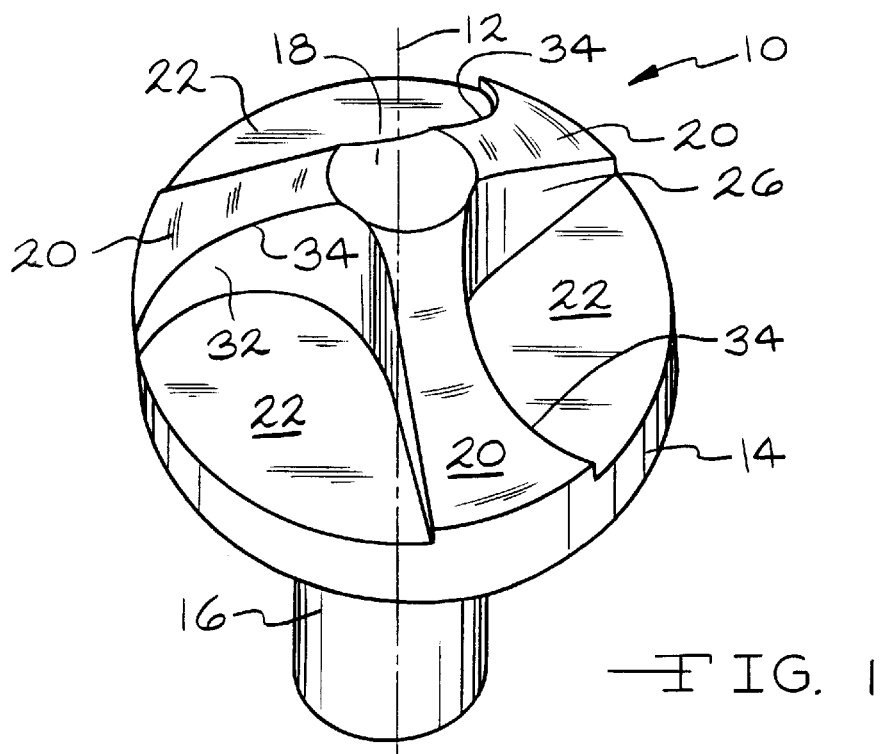
FIG. 1 is a perspective view of a frusto-conical angle milling cutter or countersink according to the present invention.
Figure 2:
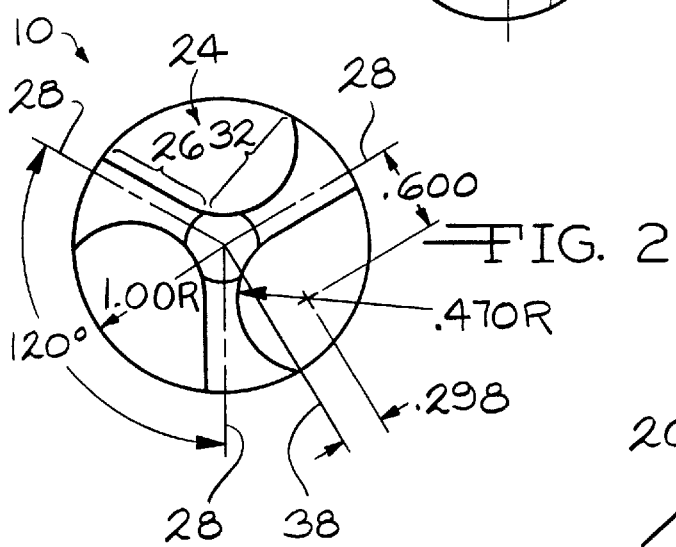
FIG. 2 is a top, plan view of a frusto-conical angle milling cutter or countersink according to the present invention.
Figure 3:
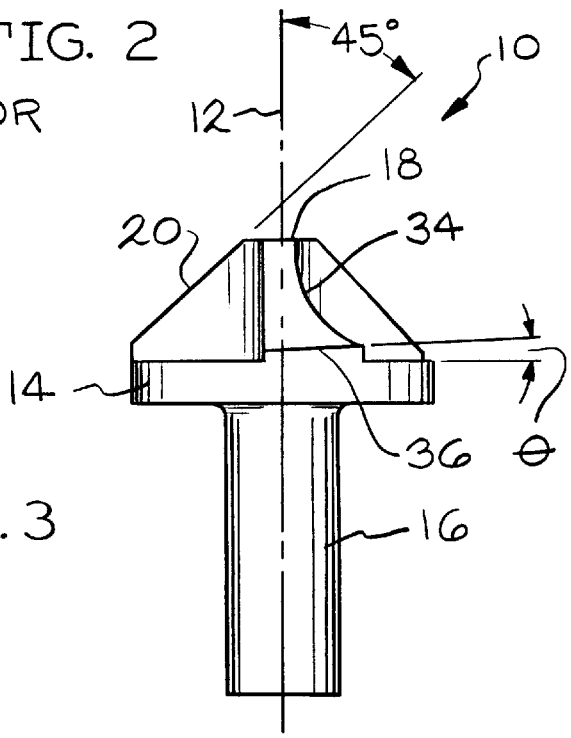
FIG. 3 is a side, elevational view of a frusto-conical angle milling cutter or countersink according to the present invention.

Referring now to FIGS. 1, 2 and 3, the first embodiment of a rotary cutting tool according to the present invention, which may be referred to as an angle milling cutter or countersink, is illustrated and generally designated by the reference numeral 10. The angle milling cutter or countersink 10 defines a longitudinally extending central reference axis 12 about which a circular body 14 and axially extending shank 16 are disposed. The shank 16 may be integrally formed with the body 14 or these components may be formed as two separate components of distinct materials and secured to one another by, for example, brazing as illustrated in the second embodiment of FIGS. 4, 5 and 6. Alternatively, the body 14 and the shank 16 may be secured to one another with threaded fasteners as taught in FIGS. 7, 8 and 9 relating to the third embodiment. If the cutter 10 is unitary it is preferably formed of, for example, tool steel. If the body 14 and the shank 16 are distinct, the shank 16 may be tool steel, such as 4140, and the body 14 may, for example, be carbide.

The shank 16 is preferably cylindrical but may include one or a plurality of flats or other features (not illustrated) complementary to a drive member, if desired. The shank 16 is intended to be received within a collet or chuck of a drill press, CNC machining center or other suitable machine as will be readily appreciated.

Opposite the shank 16, the body 14 of the countersink 10 defines a nose portion or land 18 at its terminus normal to the center axis 12 and has the general profile of a frustum of a cone. The body 14 defines a plurality of generally frusto-conical interrupted or discontinuous surface regions 20 having a preferred angle of forty-five degrees (45°) to the center axis 12 of the cutter 10. This angle may be varied widely in order to accommodate specific products and machining requirements and thus may readily be adjusted between thirty degrees (30°) and sixty degrees (60°), or wider limits if necessary.

The cutter 10 defines three flutes 22 which are equal in size and which are equally spaced about the center axis 12 of the cutter 10 at one hundred twenty degree (120°) intervals. Each of the flutes 22 is defined by a complexly shaped wall 24 having a J-shaped profile when viewed in plan as in FIG. 2. A first portion 26 of each wall 24 is straight and is preferably both parallel to and offset from a radially extending reference plane 28. As illustrated in FIG. 2, there are three radially extending reference planes 28 and they are equally spaced at one hundred twenty degree (120°) intervals about the center axis 12 of the cutter 10. Each of the straight walls 24 merges smoothly with curved, generally semi-cylindrical, i.e., radiused, walls 32, that is, the straight walls 24 are tangent to the respective curved walls 32. The curved walls 32 are disposed such that their point of parallelism is adjacent to but preferably spaced from the proximate reference plane 28. This relationship will, however, vary depending upon the actual size of the cutter 10.

The intersections of the frusto-conical surface 20 of the body 14 with the curved walls 32 which define a portion of the flutes 22 define a complexly curved cutting edge 34. There are three such cutting edges 34 on the cutter 10. The frusto-conical surface 20 immediately behind the cutting edge 34, that is, to the left as viewed in FIG. 3, is provided with an undercut 36 of several degrees from the horizontal (referenced as the angle θ) as viewed in FIG. 3 in accordance with conventional practice to improve performance of the cutter 10 and thus does not represent a true interrupted frustum of a cone. An angle of undercut of between two degrees (2°) and five degrees (5°) has been found suitable.

In order to provide a full disclosure of the invention and improve understanding thereof, dimensions have been affixed to FIG. 2 for purposes of example and illustration. It should be appreciated that the following data relates to a specific size of the cutter 10 and that larger and smaller size devices will not necessarily be proportioned precisely the same. Angle cutters or countersinks 10 according to the present invention of various sizes will, however, include all of the elements and features of the cutter 10 in the arrangement and configuration disclosed. As illustrated therein, the body 14 of the cutter 10 defines a radius of one (1) inch (2.54 cm.). With a radius of 1.000 inch (2.54 cm.), the radius of the curved walls 32 is 0.470 inches (1.19 cm.). The center at which this radius is taken is 0.600 inches (1.52 cm.) from the reference plane 28 adjacent the straight wall 26 and 0.298 inches (7.57 mm.) away from a reference plane 38 which passes through the center axis 12 and is perpendicular to the associated reference plane 28.

Figure 4:
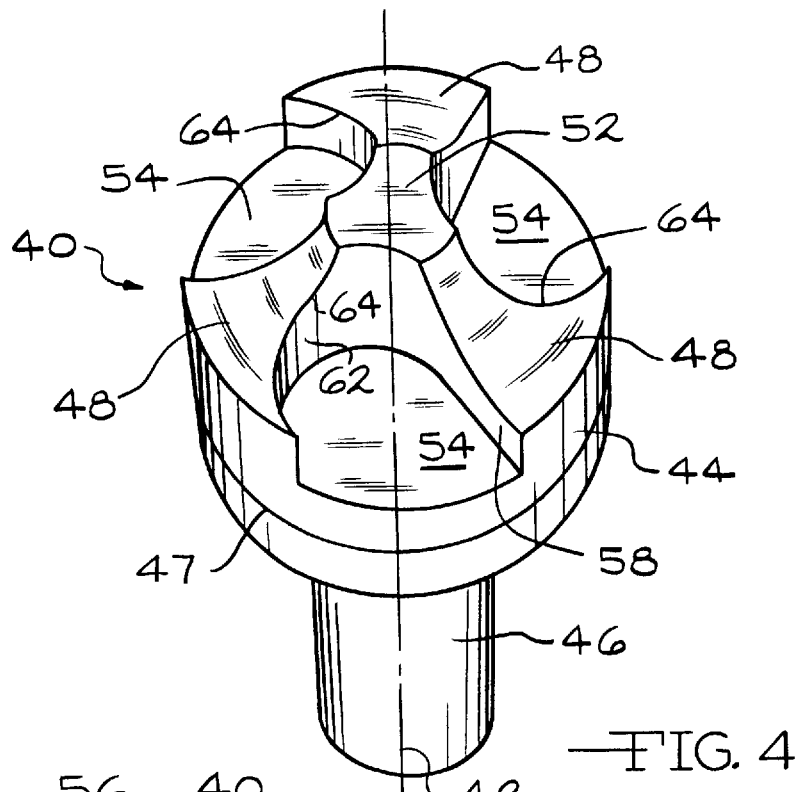
FIG. 4 is a perspective view of an end mill according to the present invention.
Figure 5:
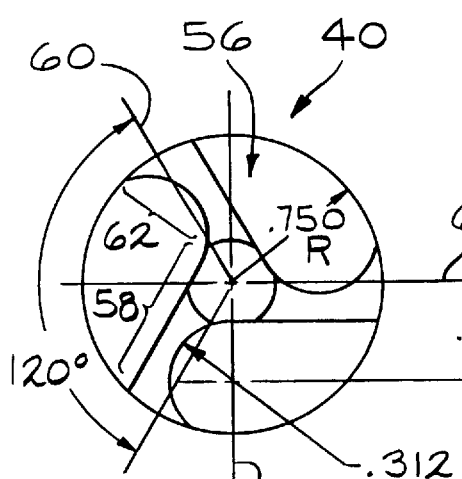
FIG. 5 is a top, plan view of an end mill according to the present invention.
Figure 6:
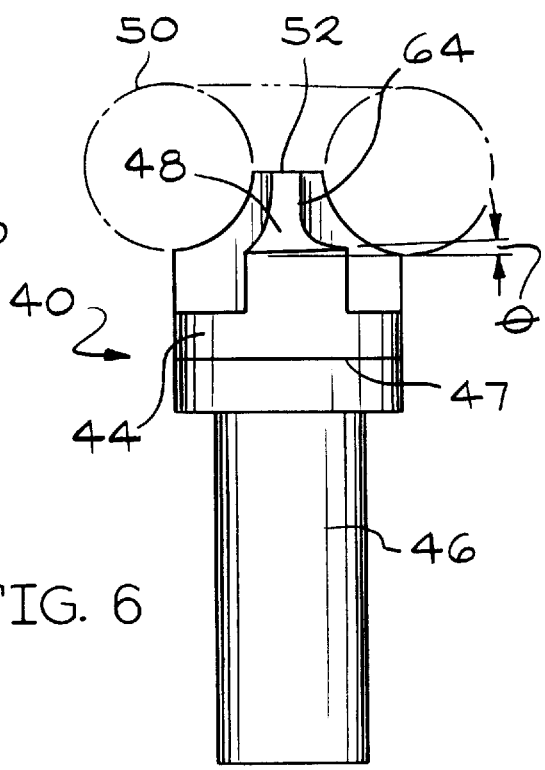
FIG. 6 is a side, elevational view of an end mill according to the present invention.

Referring now to FIGS. 4, 5 and 6, the second embodiment of a cutting tool according to the present invention, which may be referred to as a milling cutter or end mill, is illustrated and generally designated by the reference numeral 40. The end mill 40 defines a longitudinally extending center reference axis 42 about which a cylindrical body 44 and axially extending shank 46 are disposed. The shank 46 may be integrally formed with the body 44 or these components may be formed as two separate components of distinct materials and secured to one another by, for example, brazing or weldment 47. If the cutter 40 is unitary it is preferably formed of, for example, tool steel. If the body 44 and the shank 46 are fabricated separately, the shank 46 may be tool steel, such as 4140, and the body 44 may, for example, be carbide.

The shank 46 is preferably cylindrical but may include one or a plurality of flats or other features (not illustrated) complementary to a drive member, if desired. The shank 46 is intended to be received within a collet or chuck of a drill press, milling machine, CNC machining center or other suitable machine as will be readily appreciated.

Opposite the shank 46, the cylindrical body 44 of the end mill 40 includes a plurality of interrupted or discontinuous concave, i.e., re-entrant radiused surfaces 48 which generally represent one quarter of the surface of a reference torus 50. The surfaces 48 do not represent a true interrupted partial toroidal shape inasmuch as each defines a small acute angle θ of typically two degrees (2°) to five degrees (5°) of relief according to conventional cutting tool practice to improve cutting performance of the end mill 40. The radiused surfaces 48 join, preferably at a right angle, a land 52 disposed perpendicularly to and concentric with the center axis 42.

The end mill 40 defines three flutes 54 which are equal in size and which are equally spaced about the center axis 42 of the end mill 40 at one hundred twenty degree (120°) intervals. Each of the flutes 54 is defined by a complexly shaped wall 56 having a J-shaped profile when viewed in plan as in FIG. 5. A first portion 58 of each wall 56 is straight and is both preferably parallel to and offset from a radially extending reference plane 60. As illustrated in FIG. 5, there exist three radially extending reference planes 60 and they are equally spaced at one hundred twenty degree (120°) intervals about the central axis 42 of the end mill 40. Each of the straight walls 58 merges smoothly with a respective curved, generally semi-cylindrical wall 62, that is, the straight walls 58 are tangent to the respective curved walls 62. The curved walls 62 are disposed such that they pass through the proximate reference plane 60 at two locations and such that their point of parallelism is adjacent to but spaced behind the proximate reference plane 60.

The intersection of the radiused surfaces 48 of the cylindrical body 44 with the curved walls 62 which define a portion of the flutes 54 defines a complexly curved cutting edge 64. There are three such cutting edges 64 on the end mill 40.

In order to provide a full disclosure of the second embodiment of the invention and improve understanding thereof, dimensions have been affixed to FIG. 5 for purposes of illustration and example. It should be appreciated that the following data relates to a specific size of the end mill 40 and that larger and smaller size devices will not necessarily be proportioned precisely the same. End mills according to the present invention of various sizes will, however, include all of the elements and features of the end mill 40 in the arrangement disclosed. As illustrated therein, the cylindrical body 54 of the end mill 40 defines a radius of 0.750 inches (1.9 cm.). With such a radius, the radius of the radiused surfaces 48 is 0.500 (1.27 cm.) inches and the radius of the curved walls 62 is 0.3125 inches (7.94 mm.). The center at which this radius is taken is 0.500 inches (1.27 cm.) from the reference plane 60 adjacent the straight wall 58 and at the point of intersection of a reference plane 68 which passes through the center axis 42 and is perpendicular to the respective reference plane 60.

Figure 7:
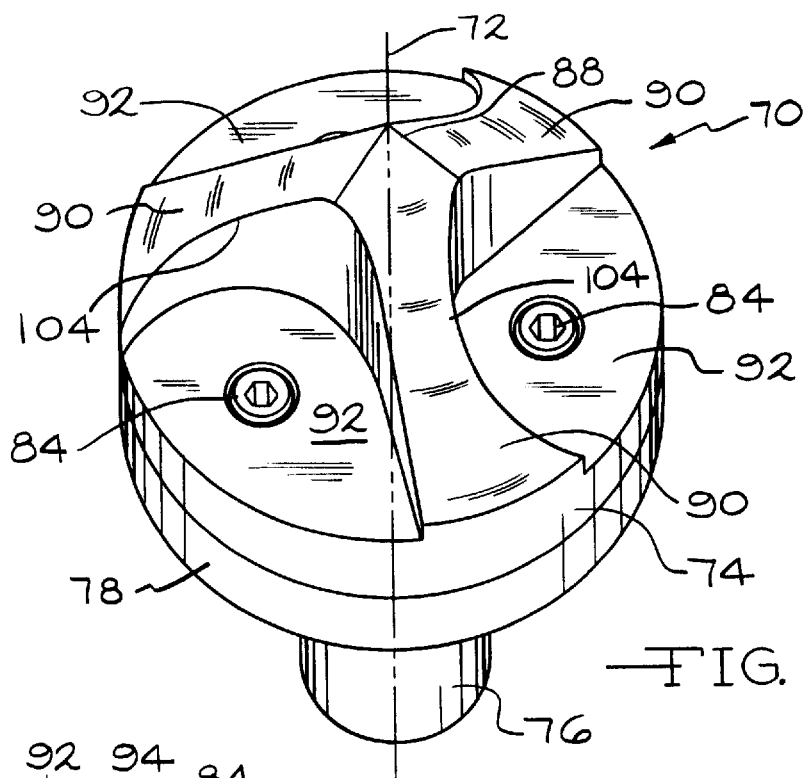
FIG. 7 is a perspective view of a conical angle milling cutter or countersink according to the present invention.
Figure 8:
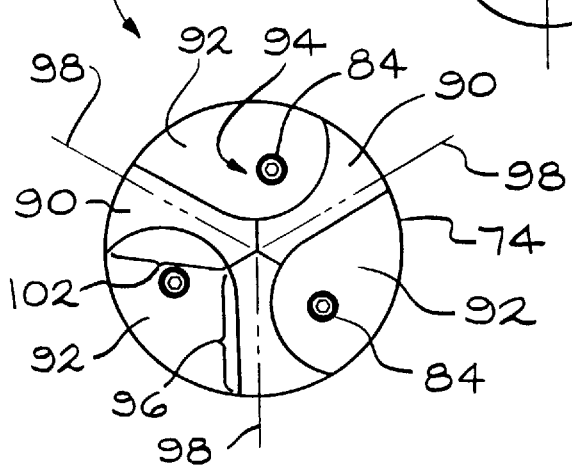
FIG. 8 is a top, plan view of a conical angle milling cutter or countersink according to the present invention.
Figure 9:
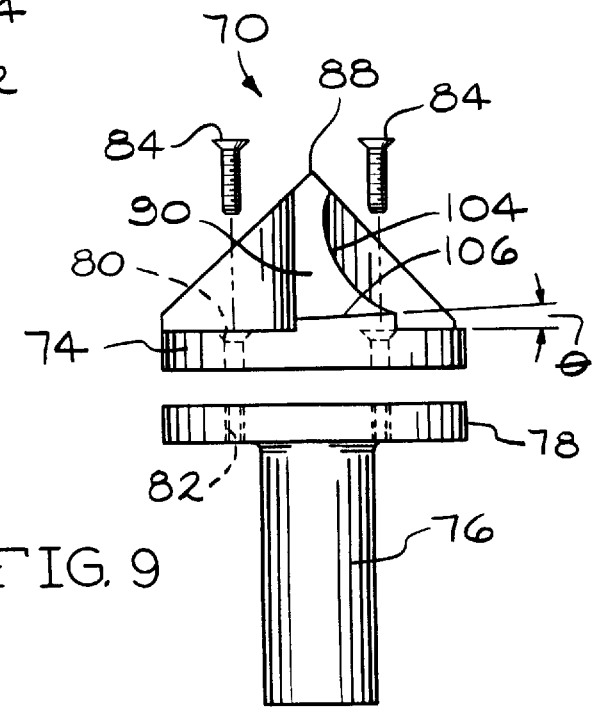
FIG. 9 is a side, elevational view of a conical angle milling cutter or countersink according to the present invention.

Referring now to FIGS. 7, 8 and 9, the third embodiment of a rotary cutting tool according to the present invention, which may be referred to as a conical milling cutter or countersink, is illustrated and generally designated by the reference numeral 70. The conical milling cutter 70 defines a longitudinally extending central reference axis 72 about which a circular body 74 and axially extending shank 76 are disposed. Preferably, the shank includes an enlarged head such as a circular plate 78. Since the body 74 and the shank 76 are fabricated as two separate components, they may be two distinct materials. Preferably, the body 74 is carbide and the shank 76 may be any appropriate tool steel such as 4140. Alternatively, the body 74 may be integrally formed with the shank 74 as shown in FIGS. 1, 2 and 3 relating to the first embodiment. These components may also be formed as two separate components of distinct materials and secured to one another by, for example, brazing as shown in FIGS. 4, 5 and 6 relating to the second embodiment.

The shank 76 is preferably cylindrical but may include one or a plurality of flats or other features (not illustrated) complementary to a drive member, if desired. The shank 76 is intended to be received within a collet or chuck of a drill press, CNC machining center or other suitable machine as will be readily appreciated.

The body 74 defines a plurality of axially oriented countersunk passageways 80 which align with axially oriented threaded apertures 82 in the circular plate 78 of the shank 76. A like plurality of threaded fasteners 84 extend through the passageways 80 and are removably received in the threaded apertures 82. A single shank 76 may thus readily be used and reused with a plurality of cutter bodies 74 by simply loosening and removing the fasteners 84, exchanging one body 74 for another and reassembling the milling cutter 70.

Opposite the shank 76, the body 74 of the milling cutter 70 defines a vertex 88 at its terminus which is coincident with the center axis 72. The body 74 thus has the general profile of a cone. The body 74 defines a plurality of generally conical interrupted or discontinuous surface regions 90 having a preferred angle of forty-five degrees (45°) to the center axis 72 of the milling cutter 70. This angle may be varied widely in order to accommodate specific products and machining requirements and thus may readily be adjusted between thirty degrees (30°) and sixty degrees (60°), or wider limits if necessary.

The milling cutter 70 defines three flutes 92 which are equal in size and which are equally spaced about the center axis 72 of the milling cutter 70 at one hundred twenty degree (120°) intervals. Each of the flutes 92 is defined by a complexly shaped wall 94 having a J-shaped profile when viewed in plan as in FIG. 8. A first portion 96 of each wall 94 is straight and is preferably both parallel to and offset from a radially extending reference plane 98. As illustrated in FIG. 8, there are three radially extending reference planes 98 and they are equally spaced at one hundred twenty degree (120°) intervals about the center axis 72 of the milling cutter 70. Each of the straight walls 96 merges smoothly with curved, generally semi-cylindrical, i.e., radiused, walls 102, that is, the straight walls 96 are tangent to the respective curved walls 102. The curved walls 102 are preferably disposed such that their point of parallelism is adjacent to but spaced from the proximate reference plane 108. This relationship will, however, vary depending upon the actual size of the milling cutter 70.

The intersections of the conical surfaces 90 of the body 74 with the curved walls 102 which define a portion of the flutes 92 define complexly curved cutting edges 104. Preferably, there are three such cutting edges 104 on the milling cutter 70. The conical surfaces 90 immediately behind the cutting edges 104, that is, to the left as viewed in FIG. 9, is provided with an undercut or relief 106 of several degrees from the reference plane defined by or including the cutting edge 104 (referenced as the angle θ) as viewed in FIG. 9 in accordance with conventional practice. The undercut or relief 106 improves performance of the milling cutter 70. Because of the relief 106, the interrupted conical surfaces 90 do not represent a true interrupted cone. An angle of relief or undercut of between two degrees (2°) and five degrees (5°) has been found suitable.

All of the cutting tools described above, the angle cutter or countersink 10, the end mill 40 and the conical milling cutter 70, share substantially the same geometry of the cutting edges 34, 64 and 104. That geometry comprehends a relieved, complexly curved cutting edge partially defined by the generally semi-cylindrical curved walls 32, 62 and 102 having reference axes which are parallel to and offset from the axes 12, 42 and 72 of the respective tools. The cutting edges 34, 64 and 104 are thus arcuate or crescent like lines representing, with respect to the angle cutter or countersink 10, the intersection of a cylinder with a cone wherein the axis of the cylinder is parallel to and offset from the axis of the cone. With respect to the end mill 40, the cutting edges 64 each represent the intersection of a first cylinder with a second cylinder having an axis perpendicular to and offset from the axis of the first cylinder. The conical milling cutter 70 is similar to the angle cutter 10. Thus, the cutting edges 104 each represent the intersection of a cylinder with a cone wherein the axis of the cylinder is parallel to and offset from the axis of the cone.

The cutting edges 34, 64 and 104 thus do not cut in a sweeping motion as a cutting edge defined by a radial line or a line passing obliquely through the center axis of a tool would but cut in shear not only because of the curvature of the cutting edges 34, 64 and 104, but also because of the linear speed differences between the motion vectors representing the inner (smaller radius) regions of the cutting edges 34, 64 and 104 and the outer (larger radius) regions.

It should be appreciated that the foregoing disclosure teaches three embodiments of a rotary milling cutter according to the present invention: the angle milling cutter 10, the end mill 40 and the conical milling cutter 70. Each of these embodiments also teaches a distinct manner of coupling the body of the respective cutter to a shank. With regard to the angle milling cutter 10, the shank 16 is illustrated as integrally formed with the body 14. The shank 46 of the end mill 40 is brazed or welded to the body 44 and these components may thus be fabricated of distinct materials. The body 74 of the conical milling cutter 70 is secured to the shank 76 by a plurality of threaded fasteners 84. Accordingly, these components may also be fabricated of distinct materials.

As noted above, it will be understood that the three embodiments of the cutting tool bodies and three configurations of bodies and shanks are fully interchangeable and compatible and thus that a total of nine combinations of cutting tool bodies and body and shank configurations may be assembled from the foregoing disclosures and further that such nine combinations are deemed to be within the scope of the present invention.

It should also be appreciated that while three cutting edges are believed to represent the best configuration of a cutting tool according to the present invention and have thus been disclosed herein, cutting tools with fewer or more cutting edges in the disclosed configuration are deemed to be well within the scope of the present invention.

The foregoing disclosure is the best mode devised by the inventor for practicing this invention. It is apparent, however, that apparatus incorporating modifications and variations will be obvious to one skilled in the art of cutting tools. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A rotary milling cutter comprising, in combination, a circular body defining an axis, a cutting end and a shank end opposite said cutting end, said cutting end having a nose, a periphery and an end surface extending from said nose to said periphery, said shank end having a shank extending along said axis, a plurality of axially extending flutes on said cutting end of said body, each of said flutes defining a wall having a curved section, a flat section tangent to said curved section and a plurality of cutting edges defined by the intersection of said curved sections with said end surface of said cutting end.

2. The rotary milling cutter of claim 1 wherein said end surface substantially defines a frustum of a cone.

3. The rotary milling cutter of claim 1 wherein said cutting edges are a re-entrant radius and said rotary cutting tool is an end mill.

4. The rotary milling cutter of claim 1 wherein said flat section is spaced from and parallel to a radial line extending from said axis.

5. The rotary milling cutter of claim 1 wherein said flat section is spaced from and parallel to a radial plane extending from said axis.

6. The rotary milling cutter of claim 1 wherein said curved section is spaced from a radial plane extending from said axis.

7. The rotary milling cutter of claim 1 wherein said flute walls are generally J-shaped in profile and said plurality of flutes includes three flutes.

8. The rotary milling cutter of claim 1 wherein said cutting edges define a relief angle of 2° to 5°.

9. The rotary milling cutter of claim 1 wherein said body and said shank are fabricated of distinct materials and are secured to one another.

10. A rotary cutting tool comprising, in combination, a circular body defining an axis and having a periphery, a shank extending from said body along said axis, a cutting end opposite said shank, a nose portion terminating said cutting end and an end surface extending from said nose portion to said periphery, a plurality of flutes formed in said cutting end of said circular body, each of said flutes defining a radiused wall section spaced from said axis, and a plurality of relieved cutting edges defined by the intersections of said radiused wall sections with said end surface.

11. The rotary cutting tool of claim 10 wherein said end surface defines a frustum of a cone and said rotary cutting tool is a countersink.

12. The rotary cutting tool of claim 10 wherein said end surface generally defines a quarter section of a torus and said rotary cutting tool is an end mill.

13. The rotary cutting tool of claim 10 wherein said end surface defines a cone.

14. The rotary cutting tool of claim 10 wherein said flutes further include a straight wall section tangential to and extending away from one end of said radiused wall section.

15. The rotary cutting tool of claim 13 wherein said flat wall is spaced from and parallel to a radial plane extending from said axis.

16. The rotary cutting tool of claim 10 wherein said flute walls are generally J-shaped in profile.

17. The rotary cutting tool of claim 10 wherein said relieved cutting edges define a relief angle of 2° to 5°.

18. A milling cutter comprising, in combination, a circular body defining an axis and having a periphery, a shank extending from said body along said axis, a cutting end opposite said shank, a nose portion terminating said cutting end and an interrupted frusto-conical end surface extending from said nose portion to said periphery, a plurality of flutes formed in said cutting end of said circular body, each of said flutes defined by a radiused wall section spaced from said axis, and a plurality of cutting edges defined by the intersections of said radiused wall sections with said frusto-conical end surface.

19. The milling cutter of claim 18 wherein said radiused wall section has an axis parallel to and spaced from said axis of said body and said flutes are further defined by a straight wall section tangential to and extending away from one end of said radiused wall section.

20. The milling cutter of claim 18 wherein said flutes are three in number and each of said flutes defines a J-shape in profile.

21. The milling cutter of claim 18 wherein said body and said shank are fabricated of distinct materials and further including means for securing said body and said shank together.

22. An end mill comprising, in combination, a circular body defining an axis and having a periphery, a shank extending from said body along said axis, a cutting end opposite said shank, a nose portion terminating said cutting end and a radiused end surface extending from said nose portion to said periphery, a plurality of flutes formed in said cutting end of said circular body, each of said flutes defining a radiused wall section spaced from said axis, and a plurality of relieved cutting edges defined by the intersections of said radiused wall sections with said radiused end surface.

23. The end mill of claim 22 wherein said radiused wall section has an axis parallel to and spaced from said axis of said body and said flutes are further defined by a straight wall section tangential to and extending away from one end of said radiused wall section.

24. The end mill of claim 22 wherein said flutes are three in number and each of said flutes defines a J-shape in profile.

25. A milling cutter comprising, in combination, a circular body defining an axis and having a periphery, a shank extending from said body along said axis, a cutting end opposite said shank, a vertex terminating said cutting end and an interrupted conical end surface extending from said vertex to said periphery, a plurality of flutes formed in said cutting end of said circular body, each of said flutes defined by a radiused wall section spaced from said axis, and a plurality of cutting edges defined by the intersections of said radiused wall sections with said conical end surface.

26. The milling cutter of claim 25 wherein said radiused wall section has an axis parallel to and spaced from said axis of said body and said flutes are further defined by a straight wall section tangential to and extending away from one end of said radiused wall section.

27. The milling cutter of claim 25 wherein said flutes are three in number and each of said flutes defines a J-shape in profile.

28. The milling cutter of claim 25 wherein said body and said shank are fabricated of distinct materials and further including means for securing said body and said shank together.

* * * * *